United States Patent Office.

HANS KUŽEL, OF HÖCHST-ON-THE-MAIN, GERMANY, ASSIGNOR TO THE FARBWERKE, VORMALS MEISTER, LUCIUS & BRÜNING, OF SAME PLACE.

AMIDO-NAPHTHOL MONOSULPHONIC ACID.

SPECIFICATION forming part of Letters Patent No. 458,285, dated August 25, 1891.

Application filed January 20, 1891. Serial No. 378,398. (Specimens.) Patented in Germany September 8, 1889, No. 53,076; in England September 26, 1889, No. 15,176, and in France November 5, 1889, No. 201,743.

*To all whom it may concern:*

Be it known that I, HANS KUŽEL, doctor of philosophy, a citizen of the Empire of Germany, residing at Höchst-on-the-Main, in the Empire of Germany, have invented certain new and useful Improvements in the Production of Amido-Naphthol Monosulphonic Acid; and I do hereby declare the following to be a full, clear, and exact description of the invention, such as will enable others skilled in the art to which it appertains to make and use the same.

This invention relates to the production of amido-naphthol monosulphonic acid by heating beta-naphthylamine disulphonic acid with caustic alkalies. When the beta-naphthylamine disulphonic acid, which is obtained by the action of ammonia upon the beta-naphthol disulphonic acid of the German Letters Patent Nos. 3,229 and 36,491, or by sulphonizing beta-naphthylamine according to the process described in the German Letters Patent No. 35,019, is heated together with alkalies to 200° to 280° centigrade, the sulpho groups are replaced successively by the hydroxyl groups, and in the first stage amido-naphthol monosulphonic acid is obtained.

Example: Thirty parts, by weight, of beta-naphthylamine disulphonic acid are mixed in a vessel with an agitator with sixty parts, by weight, of caustic soda and twenty parts, by weight, of water and heated slowly. The temperature is raised to 230° to 250° centigrade, kept so for one hour, and then heated to 260° to 280° centigrade for ten minutes more, when the amido-naphthol monosulphonic acid is formed. In order to liberate the same, the melt is dissolved in water and saturated with hydrochloric acid. The new acid is deposited from the hot solution in form of a crystalline precipitate and is obtained by filtration. For the caustic soda may be substituted some other alkali, and instead of open vessels closed vessels may be used. The temperature to be observed and the duration of the action vary according to the larger or smaller quantity of alkali employed.

The amido-naphthol sulphonic acid obtained in the way described is soluble with great difficulty in hot water, and from all the non-diazotable amido-naphthol sulphonic acids which were known up to this day (Witt, Ber., d. d. Chem., Ges., XXI, p. 3,474) it is distinguished in that when it is treated with nitrous acid it forms diazo compounds. Combined with diazo compounds or tetrazo compounds it furnishes in alkaline or acetic solution azo coloring-matters. The free acid is with difficulty soluble in water. The salts are of easier solubility.

The solution of the acid or its neutral salt shows blue fluorescence, with ferric chloride ($Fe_2Cl_6$) a dirty claret-red coloration, with chloride-of-lime solution a deep red-brown coloring, which on the addition of an excess disappears gradually. The diazo compound is yellow.

The acid has the formula:

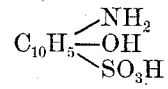

and its sodium salt

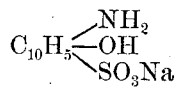

What I claim as new and my invention is—

1. The process for the production of amido-naphthol monosulphonic acid by melting the salts of beta-naphthylamine disulphonic acid with caustic alkalies, substantially as described.

2. As a new article, amido-naphthol monosulphonic acid derived from beta-naphthylamine disulphonic acid in the form of a crystalline powder of difficult solubility in water and of less solubility in alcohol of 60° Tralles, insoluble in absolute alcohol, ether, and ligroine. The solution of the acid or its neutral salts shows violet-blue fluorescence, with ferric chloride ($Fe_2Cl_6$) a dirty-red coloration, and with chloride of lime a dark red-brown coloration, which, on the addition of an excess, disappears gradually, and the diazo compound is yellow.

In testimony whereof I affix my signature in presence of two witnesses.

HANS KUŽEL.

Witnesses:
JOSEF REVERDY,
HEINRICH HAHN.